United States Patent

[11] 3,616,906

| [72] | Inventors | John P. Miller<br>Garden Grove;<br>Malcolm D. Maxsted, Torrance, both of Calif. |
|---|---|---|
| [21] | Appl. No. | 840,914 |
| [22] | Filed | July 11, 1969 |
| [45] | Patented | Nov. 2, 1971 |
| [73] | Assignee | Sweco, Inc.<br>Los Angeles, Calif. |

[54] SCREEN SUPPORT
8 Claims, 4 Drawing Figs.

[52] U.S. Cl.......................................... 209/403,
209/12, 209/254, 209/315, 209/325
[51] Int. Cl.......................................... B07b 1/36
[50] Field of Search........................................... 209/401,
402, 403, 405, 408, 412, 275, 332, 365.2

[56] References Cited
UNITED STATES PATENTS

| 1,167,927 | 1/1911 | Pfalzgraf | 209/403 |
|---|---|---|---|
| 2,088,313 | 7/1927 | Wettlaufer | 209/403 |
| 3,452,868 | 7/1901 | Miller | 209/332 X |
| 3,473,660 | 10/1921 | McKibben et al. | 209/403 |
| 3,508,649 | 4/1928 | Kahane et al. | 209/403 X |

*Primary Examiner*—Frank W. Lutter
*Assistant Examiner*—William Cuchlinski, Jr.
*Attorney*—Lyon & Lyon ABSTRACT: There is disclosed herein a screen support for the screen of a vibratory separator. An embodiment is disclosed with respect to a typical screen used in vibratory separators and including an outer tension ring, an inner tension ring and screen cloth of a desired mesh stretched between these tension rings. The present screen support includes a plurality of radially disposed member, or radiating spokes, coupled between the inner and outer tension rings. These members may be made adjustable, and the ends thereof preferably are essentially hingeably mounted with respect to the tension rings rather than being rigidly coupled thereto. The screen support is particularly useful for fine mesh screens which normally are prone to breakage because of large unsupported areas thereof. Additionally, the support eliminates secondary vibrations in the screen.

PATENTED NOV 2 1971　　3,616,906

INVENTORS:
JOHN P. MILLER
MALCOLM D. MAXSTED
BY Lyon + Lyon
ATTORNEYS

SCREEN SUPPORT

This invention relates to vibratory separators, and more particularly to a screen support for such separators.

Examples of vibratory separators of the nature disclosed herein are found in Meinzer U.S. Pat. No. 2,284,671, and Miller et al. U.S. Pat. Nos. 2,696,302, 2,714,961, 2,753,999 and 2,777,578. Vibratory separators of this type utilize one or more screens and a vibrating means including eccentric weights which cause the screen or screens to vibrate or gyrate. Typically, the material to be separated is fed to the screen and is caused to spiral outwardly to the periphery of the screen as the same vibrates. Oversize material is discharged through a peripheral chute above a screen, while undersize material falls onto a pan for discharge or onto a lower screen.

The screens may be stacked to increase capacity or to effect a more complete grading as to particle size. A variety of screen mesh sizes may be employed. The materials and mixtures which are to be separated may run the gamut of the manufacturing and processing industry. An arrangement which is suitable for one mixture may not be suitable for another; however, the operation of the separator can be adjusted for the specific material or mixture involved. One particular adjustment involves changing the relative angular positions, as well as the mass, of the eccentric weights employed to vibrate the separator. Angular adjustment, for example, affects the dwell time of the material by varying the path taken by the material and by varying the rate at which the material moves outwardly from the point of deposit to the periphery of the screen.

The present screen support concepts are an improvement over the arrangements disclosed in copending U.S. Pat. application Ser. No. 722,495, now U.S. Pat. No. 3,473,660 entitled "Tensioning Means for Circular Separator Screens," filed Apr. 18, 1968, and assigned to the assignee of the present application, the disclosure of which is incorporated herein by reference.

The screen support of the present invention is applicable to various types of screening devices, and is particularly useful with separators of the nature disclosed in copending U.S. Pat. application Ser. No. 724,316 now U.S. Pat. No. 3,452,868 entitled "Parallel Flow Separator," filed Apr. 3, 1968, and assigned to the assignee of the present application, the disclosure of which is incorporated herein by reference.

The above U.S. Pat. No. 3,452,868 discloses a vibratory separator employing a plurality of separator screens wherein a parallel flow of material to the screens is provided. The upper screen or screens are annular and have a central opening. A primary feeder device is mounted above the uppermost screen and may include adjustable openings therein. Material to be separated is fed onto the feeder device, with a portion of the material falling on the upper screen, and a portion of the material passing through the device to the lower screens. Secondary feeding devices are associated with the screens to provide a parallel feed of material to various screens. Means are provided for vibrating the structure to cause the material to move toward the periphery of the various screens and into discharge openings.

Separators such as that described above, and other separators, particularly those having relatively large screens of fine mesh and those used in certain liquid/solid separations may be substantially improved through the use of the concepts described herein. The use of radial support spokes obviates certain screen breakage, secondary vibration and screen adjustment problems. For example, the support spokes provide support for very fine mesh screens which normally are prone to breakage because of the large unsupported screen areas. The support spokes serve to eliminate secondary vibrations in the screens. This is particularly important in liquid/solid separations where secondary vibrations hamper rather than promote separation, such as in the separation of waste activated sludge. Furthermore, the use of such support spokes enables the center of the screen to be inclined (raised or lowered) in relation to the outer tension ring while still providing suitable screen support.

Accordingly, it is a principal object of the present invention to provide an improved screening device.

It is an additional object of this invention to provide a novel screen support for use with screens of vibratory separators.

A further object of this invention is to provide a screen and support assembly.

Another object of this invention is to provide an improved vibratory screening apparatus.

These and other objects and features of the present invention will become better understood through a consideration of the following description taken in conjunction with the drawing in which.

Figure 1:
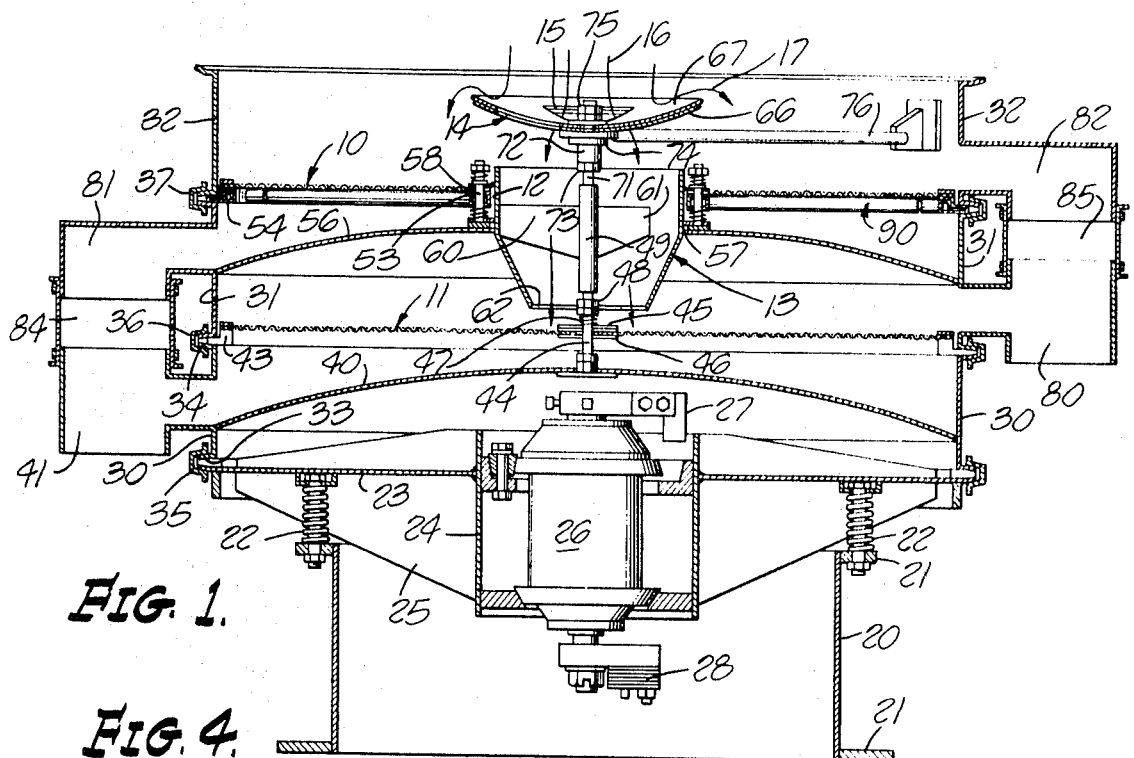
FIG. 1 is an elevational cross-sectional view of a two deck vibratory separator incorporating the screen support of the present invention.

Turning now to the drawings, FIG. 1 illustrates a vibratory separator generally as described in said application Ser. No. 724,316 now U.S. Pat. No. 3,452,868 but further incorporating the concepts of the present invention. Briefly, the apparatus illustrated in FIG. 1 is a vibratory separator for separating components of a feed material, either dry or liquid/solid, and includes a pair of screens 10 and 11 mounted one above the other. The upper screen 10 has a central opening 12, and has a secondary material feed distributor 13 associated therewith. A primary feed distributor 14 is mounted above the uppermost screen 10 and has one or more openings 15 therein to allow a portion of the feed material to pass therethrough as indicated by arrow 16. Overflow from the primary distributor 14 flows to the upper screen 10 as indicated by arrows 17.

Considering the separator shown in FIG. 1 in more detail, the same includes a cylindrical base shell 20 having end flanges 21. The upper flange supports a plurality of upright springs 22, the ends of which are suitably attached, as with bolts, respectively to the upper flange and to the underside of a base plate 23. The baseplate 23 is circular, and fitted centrally within the base plate is a cylindrical motor shell 24. Radial gussets 25 extend outwardly from the shell 24 and are secured, as by welding, to the underside of the base plate 23. A motor 26 is supported within the motor shell 24. The ends of the shaft of the motor 26 carry upper and lower eccentric weights 27 and 28 such that on rotation of the shaft of the motor 26, the baseplate 23 is vibrated or shaken, such as set forth in the aforementioned Meinzer patent. An opening (not shown) may be provided in the baseplate 23 to enable adjustment of either the mass or angular position of the upper weight 27.

The baseplate 23 supports a series of cylindrical sections or shells 30 through 32 each having as its axial extremities radially outwardly extending flanges, such as flanges 33 and 34 on the shell 30. The flanges of adjacent sections are engaged by clamp rings 35 through 37 to retain the various sections together. That is, the clamp ring 35 secures the section 30 to the baseplate 23, the ring 36 secures the section 30 to the section 31, and the ring 37 secured the section 31 to the upper section 32.

Section 30 includes a discharge dome 40 which is in the form of an inverted pan, the periphery of which is welded, or otherwise secured, to the interior wall of section 30. This section includes a discharge spout 41 which receives undersize material from the upper surface of the discharge dome 40.

The conventional separator screen 11 of desired mesh has an outer tension ring 43 which fits between the respective upper and lower flanges of sections 30 and 31 and is retained in position by the clamp ring 36. A tension bolt 44 is secured to and projects upwardly from the center of the discharge dome 40 and extends through the center of the screen 11 which has a pair of washers 45 and 46 affixed to the center thereof. A spring 47 and nuts 48 are positioned on the upper end of the bolt 44, adjustment of the nuts 48 enabling the center of the screen 11 to be drawn downwardly for tensioning purposes. The upper end of the bolt 44 may be threaded onto a support rod 49 which is affixed to the primary feed distributor 14.

In a similar manner, the screen 10 is mounted between the respective sections 31 and 32. However, the screen 10 has both inner and outer tension rings and a central discharge opening therethrough. Thus, the screen 10 is secured to respective inner and outer tension rings 53 and 54, and includes the central opening 12. A discharge dome 56 underlies the screen 10 in the same manner as the discharge dome 40, but the dome 56 includes a central opening 57. The periphery of the dome 56 is welded, or otherwise secured, to the interior wall of the section 31. A plurality of tension bolts 58 (not FIG. 3) are secured to the dome 56 around the opening 57 and extend upwardly through the inner tension ring 53 to enable tensioning of the screen 10 in the same manner the tension bolt 44 serves to tension the screen 11. Typically, six bolts 58 are used with the tension ring 53.

The product feed distributor 13, which may be termed a secondary distributor, is spaced from and extends through the central opening of the screen 10. The distributor is in the form of a cylindrical can of lightweight material, such as aluminum or plastic. The distributor 13 is affixed to the support rod 49 by a plurality of gussets, such as three, only gussets 60 and 61 being seen in FIG. 1. The distributor 13 is frustoconical and has a lower opening 62 which is appropriately sized to control the rate of feed of material onto the lower screen 11. The openings 15 through the primary distributor 14 are adjusted depending upon the rate of feed of material to the separator as more fully described in said U.S. Pat. No. 3,452,868. If desired, an annular seal gasket of rubber or the like, such as a gasket 63, may be provided between the screen and the secondary distributor. A gasket of this nature is better illustrated in FIG. 3 and serves to prevent material from flowing between the inner tension ring and secondary distributor.

The primary feed distributor 14 mounted at the top of the separator includes a pair of dish-shaped discs 66 and 67, each having the plurality of openings 15 therethrough. A stud 71 is coupled with the support rod 49 and extends through the center of the disc 66 and 67. A collar 72 and lock nut 73 are provided on the stud 71, along with a washer 74 and jam nuts 75 which serve to secure the disc 66 and 67 to the rod 49 and to three radial support rods, only rod 76 being seen in the drawing. The lower disc 66 is affixed to the support rods and the outer ends of the rods affixed to brackets which in turn are welded to the interior wall of this section 32. The upper end of the collar 72 is keyed to the support rods to prevent rotation of the collar and loosening of the distributor 14 and support rod 49 assembly. The nut 75 may be loosened to adjust the position of the disc 67 relative to the disc 66 to vary the effective opening through the distributor 14 provided by the pie-shaped opening 15. A feed pipe (not shown) for material to be separated may be mounted in any convenient manner above the primary distributor 14. Alternatively, if desired, the distributor 13 can be heightened and the lower disc 66 welded thereto In this case, the disc 67 is bolted to the disc 66, and either the support rod 49 or rods 76 may be eliminated.

The section 31 includes discharge spouts 80 and 81, and the section 32 includes a discharge spout 82. The discharge spout 80 receives oversized material which does not pass through the screen 11, the spout 81 receives undersized material which passes through the screen 10, and the spout 82 receives oversize material which does not pass through the screen 10. Thus, the spouts 41 and 81 may be coupled together to receive undersized material, and the spouts 80 and 82 coupled together to receive oversized material. Spout connectors 84 and 85, which may be metal or a flexible material such as neoprene, are used. Alternatively, where different mesh screens are employed, the various separated components may be separately discharged.

Figure 3:
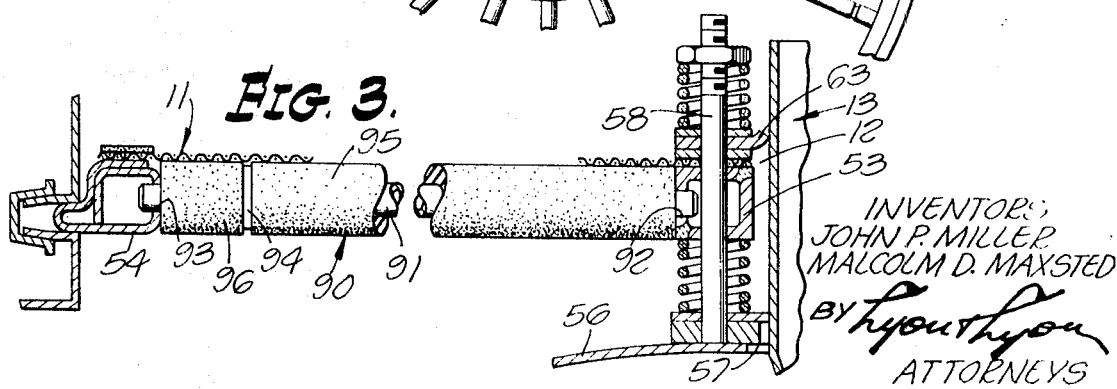
FIG. 3 is a view taken along a line 3—3 of FIG. 2 illustrating one of the support members of the screen support.

Turning now to the screen support, the same includes a plurality of radiating members or spokes 90 coupled between the inner tension ring 53 and outer tension ring 54. These spokes may be constructed in several ways. As shown in FIG. 3, the spoke 90 includes an inner cylindrical tube or rod 91, one end of which extends into an aperture 92 in the inner tension ring 53 and the other end of which extends into an aperture 93 in the outer tension ring 54. A washer 94 is welded to the tube 91 intermediate the ends thereof as shown in FIG. 3. A rubber sleeve, which is in two sections 95 and 96, is mounted over the tube 91 and provides a resilient support for the lower surface of the screen 10. It will be apparent that by merely cutting the sleeve sections 95 and 96 to the proper lengths that either or both sleeve sections can be compressed for allowing insertion of the spoke 90 between the inner and outer tension rings, while still providing sufficient pressure of bias to maintain the ends of the inner tube 91 properly coupled with the tension rings. Alternatively, the tube 91 may be coated with a resilient material, such as polyurethane.

Figure 2:
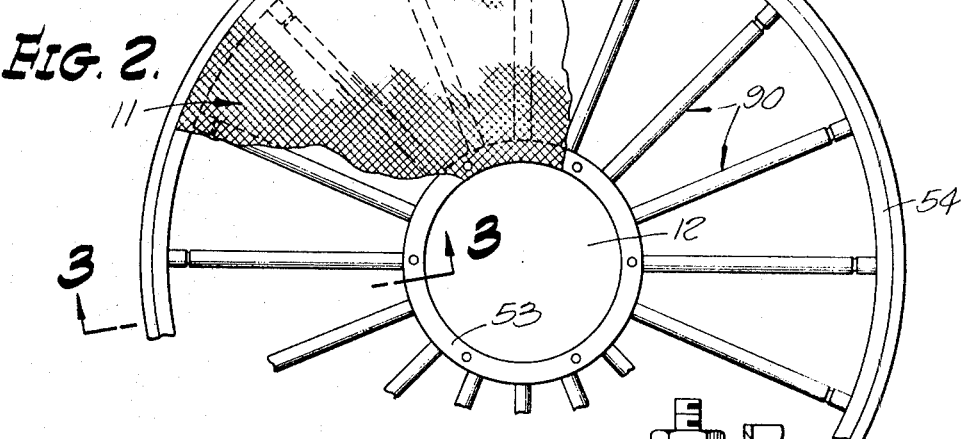
FIG. 2 is a partial plan view of a screen and screen support according to the present invention.

As seen in FIG. 2, 16 spokes 90 are provided, although a fewer or greater number may be used. It is preferred that the ends of the spokes be essentially loosely coupled with the apertures 92 and 93 of the respective inner and outer tension rings 53 and 54 because of the relatively severe vibrations to which the spokes are subjected, but the ends of the spokes may be welded or bolted to the tension rings. However, if the spokes are firmly affixed to the rings, it has been found that the rigid joint frequently fails because of the vibrations involved. Furthermore, the nonrigid or loose coupling is preferred because the spokes then are readily removable.

Figure 4:
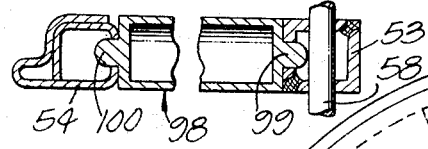
FIG. 4 is an alternative configuration of a screen support member.

FIG. 4 illustrates an alternative embodiment wherein a cylindrical rod 98 having closed ends with rounded tips 99 and 100 is provided. The tips 99 and 100 effectively are hingeably coupled with the apertures in the respective inner and outer tension rings 53 and 54. If desired, a resilient washer or the like may be mounted between the end faces of the rod 98 and the respective tensioning rings 53 and 54. Additionally, a layer of resilient material, such as polyurethane, may be applied to the outer surface of the spoke 98 to provide a resilient bearing surface for the lower surface of the screen 10. This reduces the abrasive action of the spoke on the screen. A one-piece rubber sleeve also may be used inasmuch as the end faces and tips of the rod 98 provide a secure, but slightly loose, coupling to the tension rings. As another alternative, a telescoping fitting having one or more threaded members, or the like, to allow adjustment of the radial size of the spoke may be employed.

Although a screen support according to the present invention is illustrated only for the upper screen 10, a similar support may be used for the lower screen 11 which does not include a central discharge opening. In this case, a smaller inner ring is secured to the lower washer 46 at the center of the screen 11 to provide a coupling member for the inner ends of the spokes. It also should be noted that either or both of the screws 10 and 11 may have one or more layers of screening material stretched between the tension rings thereof.

As noted earlier, a screen support in accordance with the present invention is particularly useful with relatively fine mesh screens inasmuch as such screens are prone to breakage because of the large unsupported areas thereof. The support is particularly useful with relatively large screens, for example, 45 inch and larger diameter screens. Another particularly important feature of the screen support is that the same eliminates secondary vibrations in the screen. Elimination of such secondary vibrations is important in liquid/solid separations where such secondary vibrations generally hamper rather than promote separation, such as in the separation of waste activated sludge and in breaking up of flocculations. Although a circular screen is described and illustrated other configurations, such as rectangular, may be employed, and the term tension ring is used to mean a ring member, whether circular or another configuration, which aids in supporting the screen material.

Additionally, the screen material may be secured to the stop edges of the spokes with a suitable adhesive, such as an epoxy. This effectively divides the screen into pie sections, and if one such section tears only the torn section need be replaced. This is accomplished by cutting out the torn section and securing a new pie section in place with an adhesive.

In the operation of the separator illustrated in FIG. 1, the eccentric weights 27 and 28 coupled with the shaft of the motor 26 are adjusted in angular position and in mass such that when the motor is running, material on the screens is caused to progress outwardly toward the periphery of the screens, ultimately with the oversize material being discharged through the discharged spouts 80 and 82. As is known to those skilled in the art there is a null point, or small area, vertically along a line extending through the shaft of the motor 26. The motor 26 is preferably mounted relatively high in the shell 24 so that the null point is above the upper screen 10. This provides a better peripheral movement of material on the upper screen than if the null point were below or at the screen 10.

The separation to be performed may be with dry feed material where particles of different sizes are separated, or may be with a liquid/solid feed material where the solid and liquid are separated. The material is fed onto the adjustable feed distributor 14, usually from a fed pipe (not shown). The relative adjustment of the disc 66 and 67 determines the effective size of the openings 15 therethrough, and thus the amount of feed material which passes through the primary distributor 14 and the amount which overflows onto the upper screen 10 may be readily selected. The openings 15 are selected to be relatively small for a low material feed rate and large for a high feed rate. The openings in the distributor 14 generally are adjusted so as to provide a substantially equal flow to the two screens for the maximum expected flow from the feed pipe. This is accomplished by adjusting the openings with normal flow so that less than one-half overflows onto the top screen 10 thereby allowing substantially equal distribution for maximum or surge flow. Adjusted in this manner, the lower, more efficient screen is more heavily loaded during normal flow.

The present screen support may be sued in a self-cleaning screen arrangement as described in U.S. Pat. No. 3,366,239. In this case, a lower supporting screen is mounted below the spokes 90, and screen-cleaning sliders are positioned between the added screen and the screen 11 and in between the spokes 90.

What is claimed is:

1. A vibratory separator having a substantially circular screening member and a support for said screening member comprising
   a base,
   housing means,
   a vibratory source attached to said housing means,
   means resiliently coupling said housing means and vibratory source with said base for allowing said housing means to be vibrated by said source,
   an outer substantially circular tension ring and an inner support, said outer tension ring and inner support having substantially facing sides with apertures therein,
   a screen secured between said outer tension ring and said inner support,
   a plurality of spoke means resiliently coupled between said outer tension ring and said inner support for supporting rather than exerting continuous upward force for bowing the underside of said screen, each of said spoke means including a central member having ends coupled between respective apertures in said respective outer ring and inner support, and
   means for moving said inner support with respect to said outer tension ring.

2. A screen assembly for use with screening apparatus wherein a screen is subjected to vibrations comprising
   inner and outer rings for supporting a screen, said inner ring having apertures on an outer side thereof and said outer ring having apertures on a inner side thereof,
   a screen secured between said inner and outer rings, and
   a plurality of spoke means resiliently coupled between said inner and outer rings for supporting the underside of said screen, each of said spoke means including a central member having ends coupled between respective apertures in said respective inner and outer rings.

3. An assembly as in claim 2 wherein
   said central member comprises a tubular member having end faces with tips thereon, said tips respectively being coupled with apertures in said inner and outer rings.

4. A screen assembly for use with screening apparatus wherein a screen is subjected to vibrations comprising
   inner and outer tension rings for supporting a screen, said inner tension ring having apertures on an outer face thereof and said outer tension ring having apertures on an inner face thereof,
   a screen secured between said inner and outer tension rings, and
   a plurality of spoke means resiliently coupled between said inner and outer tension rings for supporting the underside of said screen, each of said spoke means including a central rod member having ends coupled between respective apertures in said respective inner and outer tension rings and having a barrier member affixed intermediate the ends of said rod member, and each of said spoke means including a resilient covering on said rod member, said resilient covering extending from substantially adjacent each end of said rod member to said barrier member.

5. An assembly as in claim 4 wherein
   said resilient covering includes a pair of rubber sleeves for each of said spoke means.

6. A vibratory separator having a screening member and a support for said screening member comprising
   a base,
   housing means,
   a vibratory source,
   means resiliently coupling said housing means and vibratory source with said base for allowing said housing means to be vibrated by said source,
   an outer tension ring and an inner support, said outer tension ring and inner support having substantially facing sides with apertures therein,
   a screen secured between said outer tension ring and said inner support, and
   a plurality of spoke means resiliently coupled between said outer tension ring and said inner support for supporting the underside of said screen, each of said spoke means including a central member having ends coupled between respective apertures in said respective outer ring and inner support, each of said spoke means including a dividing member affixed to said central member and a resilient covering on at least a portion of said central member, said resilient covering including sleeve sections mounted on said central member on each side of said dividing member, at least one of said sleeve sections being compressible to allow short portions of the ends of said central member to engage said outer tension ring and inner support.

7. A screen assembly for use with screening apparatus wherein a screen is subjected to vibrations comprising
   inner and outer rings for supporting a screen, said inner ring having apertures on an outer side thereof and said outer ring having apertures on an inner side thereof,
   a screen secured between said inner and outer rings, and
   a plurality of spoke means resiliently coupled between said inner and outer rings for supporting the underside of said screen, each of said spoke means including a central member having ends coupled between respective apertures in said respective inner and outer rings, each of said spoke means including a dividing member affixed to said central member and a resilient covering on at least a portion of said central member, said resilient covering including sleeve sections mounted on said central member on each side of said dividing member.

8. An assembly as in claim 7 wherein at least one of said sleeve sections is compressible in a longitudinal direction for facilitating engagement of a respective spoke means with said inner and outer rings.